Figure 1:
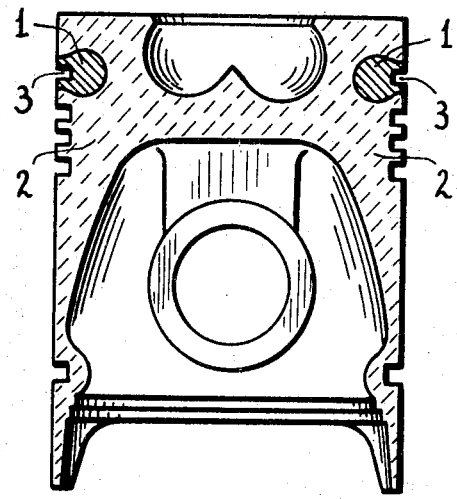

United States Patent

[11] 3,533,329

| [72] | Inventor | Ercole Galli |
| --- | --- | --- |
| | | Corso Bramante 47, I-10, 126, Turin, Italy |
| [21] | Appl. No. | 761,408 |
| [22] | Filed | Sept. 23, 1968 |
| [45] | Patented | Oct. 13, 1970 |
| [32] | Priority | Jan. 9, 1968 |
| [33] | | Italy |
| [31] | | 50,054A/68 |

[54] METHOD FOR MANUFACTURING LIGHT ALLOY PISTONS WITH AN INSERT OF A DIFFERENT METAL, AND PISTONS MANUFACTURED THEREBY
10 Claims, 2 Drawing Figs.

[52] U.S. Cl. ............................................. 92/222,
92/224, 92/225, 29/156.5, 29/527.6
[51] Int. Cl. .................................................. B23p 15/10,
B23p 17/00, B23h 25/00, F16j 1/04
[50] Field of Search ............................................ 29/156.5,
527.6; 92/222, 225, 227, 228, 229

[56] References Cited
UNITED STATES PATENTS

| 2,124,360 | 7/1938 | Welty | 29/156.5 |
| 2,550,879 | 5/1951 | Stevens | 92/222 |
| 3,402,644 | 9/1968 | Geiger et al. | 92/224 |

Primary Examiner—Martin P. Schwadron
Assistant Examiner—Robert R. Bunevich
Attorney—Young & Thompson ABSTRACT: A method for manufacturing light alloy pistons having an insert of a different metal, consisting in forming an insert of a copper-base metallic alloy, immersing said insert in a fused bath of aluminum alloy, incorporating said insert in the casting of an aluminum alloy piston and finally machining the piston along with the incorporated insert.

A light alloy piston incorporating an insert made of a copper-base metallic alloy.

Patented Oct. 13, 1970 3,533,329

INVENTOR
ERCOLE GALLI
BY Young & Thompson
ATTORNEYS

METHOD FOR MANUFACTURING LIGHT ALLOY PISTONS WITH AN INSERT OF A DIFFERENT METAL, AND PISTONS MANUFACTURED THEREBY

It is known that pistons manufactured of light alloy are subject to wear, deformation or cracking in areas subjected to concentrated stresses, and hence particularly at the seatings for the gudgeon pin, on the head, and especially in the area of the seating for the sealing segment nearest the head, where under the effect of the hammering caused by this segment there takes place a broadening of the seat with consequent deterioriation of the seal.

With the aim of avoiding these disadvantages, it has been proposed to incorporate inserts of ferrous material (cast iron, special steels) during the melting of the pistons, the material being better adapted than light alloy to withstand concentrated stresses. However, these inserts of ferrous material involve serious disadvantages due to the appreciable difference in thermal expansion, to the by no means satisfactory bond between the insert and the piston body, to the considerable brittleness of the zone occupied by the ferro-aluminic intermetallic compound at the interfaces, and to the low thermal conductivity of the ferrous insert relative to the aluminum alloy piston body. A further serious defect of ferrous metal inserts is that they hinder any subsequent heat treatment of the piston, which would cause separation of the insert. Also the procedure needed in preparing the insert before its incorporation in the piston body melting is relatively long and not easy to perform, involving the use of baths of special alloy which must be replaced from time to time because of progressive enrichment with iron.

The aim of the invention is to provide a method for the manufacture of light alloy pistons, with an insert of a different metal, which is practical, rapid and industrially advantageous, which does not involve the use of special baths for preparing the insert, and which produces pistons, themselves also forming a subject of the invention, having an insert of thermal expansion substantially identical to that of the body, bonded to the body in effective manner by means of a relatively thick layer of intermetallic alloy of favorable mechanical properties, said insert also having a thermal conductivity sufficiently near or even higher than that of the piston body, so as to form no impediment to heat flow, not to deform the lines of flow, and to minimize the temperature differences from point to point in the piston, hence limiting the mean and the maximum temperatures thereof, and adapted for subjection to any suitable heat treatment.

The means proposed by the invention to provide these advantages comprise the use of an insert consisting of a copper alloy, in particular an aluminum bronze, preferably subjected to plastic deformation, and preferably immersed on insertion in the mould in a fused aluminum alloy which may with advantage be that used for casting the piston. The copper-base intermediate alloy thus formed has specifically those features mentioned above, and enables the required favorable results to be achieved.

Figure 2:
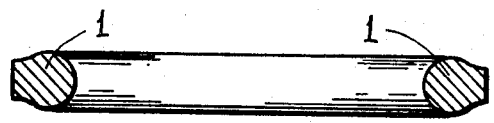

The invention will be explained more clearly below with reference also to the attached drawings, wherein:

FIG. 1 is an axial section of a piston produced by means of the invention, after mechanical forming;

FIG. 2. shows in similar section an insert before it is placed in the die.

Reference is made in these drawings to the production of a piston with an insert forming the seating for the first sealing ring: but this nonlimitative example will suggest to the technician the application of the invention also to the case of differently disposed inserts, for example about the gudgeon pin seating, or on the head.

According to a first feature of the invention, the insert 1, in this case of annular form, is formed of a copper-base alloy, in particular an aluminum bronze which may advantageously have a copper content of 80—90 percent or thereabouts; optimum results have been obtained experimentally by using alloys to make the insert having compositions comprised in the following limits: copper 75—90 percent, nickel 2—7 percent, manganese 0.5—4 percent, iron 2—6 percent, aluminum 7—13 percent.

According to a further feature of the invention, this insert is not produced by simple melting, but by plastic working which gives the material considerably improved mechanical properties. In the example of an annular insert 1 as illustrated, this may be for instance produced by casting an ingot of selected material, extruding a tube, cutting the tube into elements of suitable length and then stamping said elements into the final shape shown.

In carrying out the method of manufacture, the insert thus formed is immersed in a bath of fused alloy which may be the same as that used for casting the piston; the immersion may also be advantageously effected in the same crucible from which the melted alloy will be poured for casting. A limited period, of the order of one-third of a minute, is required for immersion. Consequently on repeated immersions of inserts the bath becomes enriched with copper, but this does not damage the properties; also since the same bath supplies the alloy for casting the pistons, it is rapidly used up and is added to, so that the copper enrichment tends not to exceed a specific limit; if considered desirable, the enrichment may be fully compensated by making additions of an alloy slightly poorer in copper than that provided for casting the piston.

The insert 1 after its preliminary immersion is inserted in the mould and has cast about it the piston 2 which incorporates it. During the casting and the setting thereof, an appreciable dissolution of the insert surface within the body of aluminum alloy forming the piston takes place, with the formation of a layer of copper-aluminum alloy of consistent thickness (*e.g.* a few tenths of a millimeter) and composition varying gradually from a maximum to a minimum copper content, which embeds the insert in the piston body in very effective manner. After removal from the mould the piston with its insert is machined to form in said insert 1 the seating 3 (in the example shown) for the first sealing ring. In the course of said mechanical forming the advantage is noted that the copper-base alloy insert has optimium machining properties. The piston may also be subjected to heat treatments (tempering, annealing, etc.) to improve its properties, without any danger of detaching the insert or other disadvantage.

By suitable choice of the copper-base alloy composition used for the insert, it is possible to approach with considerable precision the thermal expansion of the alloy forming the piston. Also the thermal conductivity of the insert and of the intermetallic alloy surrounding it are close to or even higher than that of the piston alloy, which avoids any hindrance or disturbance in the transmission of heat.

Suitable choice of additions of specific metals to the copper-base alloy comprising the insert, as taught by known metallurgical technology, enables the insert to be given properties of high hardness, mechanical strength and resistance to wear when hot, thus under the conditions of use.

It should be noted that the invention may be applied to the manufacture of pistons of any nature, type and form, intended for compressors and especially to heat engines, and in particular that the inserts may be used at any part of the piston, and two or more may possibly be used for each piston.

I claim:

1. A method for manufacturing light alloy pistons having an insert of a different metal, comprising the steps of forming at least one insert of a copper-base metallic alloy, immersing said insert in a fused bath of a first aluminum alloy, arranging said insert into a casting mould, casting a second fused aluminum alloy similar to said first alloy into said casting mould containing said insert, removing from said mould the cast piston incorporating said insert and finally machining said piston along with the incorporated insert.

2. A method as set forth in claim 1, further comprising the step of subjecting said formed insert comprising a copper-base metallic alloy to a plastic working before immersing it in said fused bath of aluminum alloy.

3. A method as set forth in claim 1, further comprising the step of subjecting said cast piston incorporating at least one insert to a thermic treatment before finally machining them.

4. A method as set forth in claim 1, wherein said immersion of the insert in a fused bath of aluminum alloy is effected for a short period of the order of a fraction of a minute.

5. A method as set forth in claim 1, wherein said first and second aluminum alloys are identical.

6. A method for manufacturing light alloy pistons having an insert of a different metal, comprising the steps of forming at least one insert of a copper-base metallic alloy, subjecting said formed insert to a plastic working, immersing for a short period of a fraction of a minute said insert in a fused bath of aluminum alloy, arranging said insert into a casting mould, casting from said fused bath the aluminum alloy into said casting mould containing said insert, removing from said mould the cast piston incorporating said insert and finally machining said piston along with the incorporated insert.

7. A light alloy piston incorporating in the piston body at least one insert of a different metal, wherein said insert comprises a copper-base metallic alloy, and wherein in the transition zone between the insert and the piston body there is a relatively large thickness, of the order of some tenths of a millimeter, of an intermetallic alloy based on aluminum and copper, having a gradually varying composition and forming a bond between the insert and the piston body.

8. A piston as set forth in claim 7, wherein said insert has the metallographic structure and the mechanical properties denouncing having undergone a plastic working operation.

9. A piston as set forth in claim 7, wherein the copper-base alloy forming the insert contains additions in order to give it hardness, mechanical strength and resistance to wear under operating conditions.

10. A light alloy piston incorporating in the piston body at least one insert of a different metal, wherein said insert comprises a metallic alloy having a composition comprised in the following limits: copper 75—90 percent; nickel 2—7 percent; manganese 0.5—4 percent; iron 2—6 percent; aluminum 7—13 percent.